Dec. 21, 1926.                                                          1,611,398
                              E. J. WIGGINS
                       FLUID CONTROLLING APPARATUS
                       Original Filed March 9, 1921
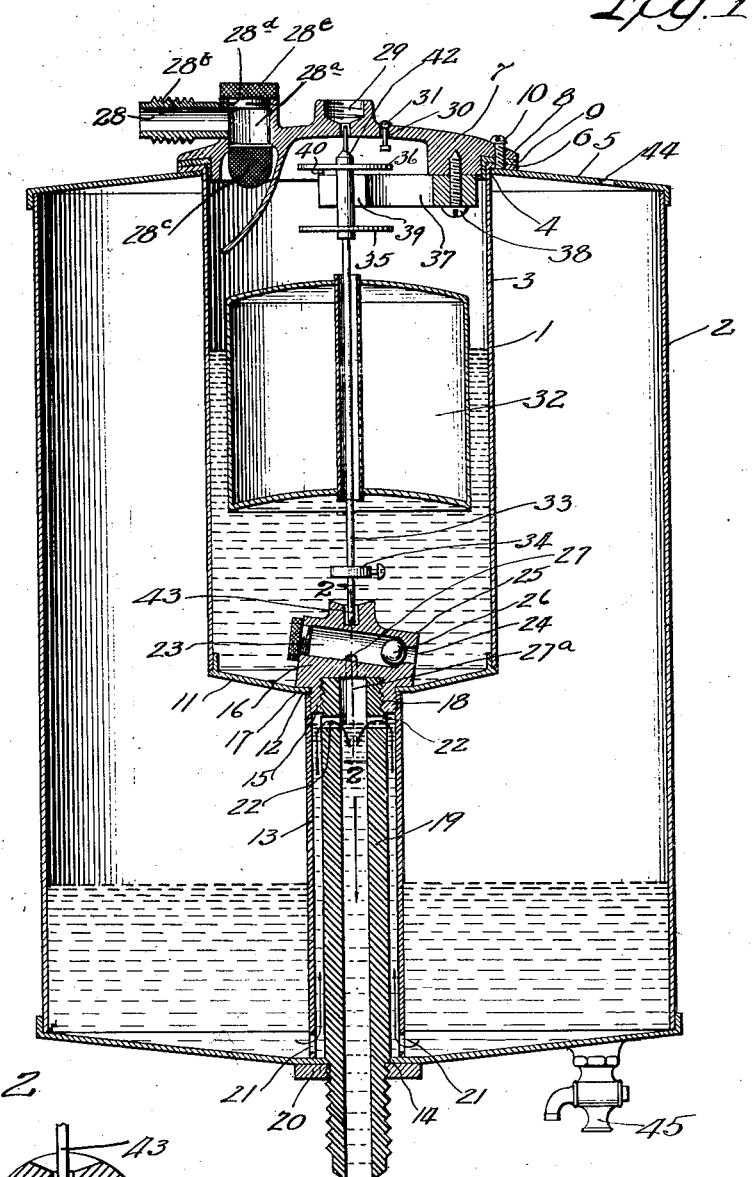
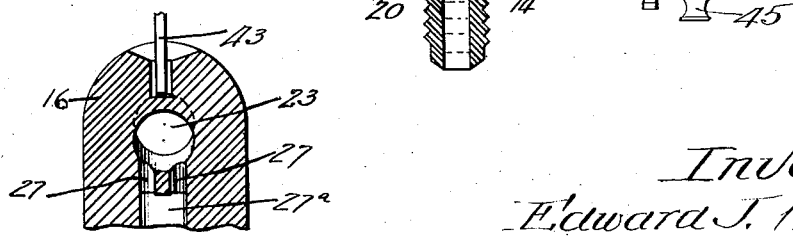
Inventor;
Edward J. Wiggins Patented Dec. 21, 1926.

1,611,398

UNITED STATES PATENT OFFICE.

EDWARD J. WIGGINS, OF CHICAGO, ILLINOIS, ASSIGNOR TO REICHMANN COMPANY, OF CHICAGO, ILLINOIS.

FLUID-CONTROLLING APPARATUS.

Application filed March 9, 1921, Serial No. 450,989. Renewed May 26, 1926.

My invention relates, more particularly, to apparatus for lifting liquid from one level to another through the medium of suction action and employing a main suction receptacle, into which the fluid is drawn, and a secondary, or supplemental receptacle fed by the main receptacle and serving as a storage, or reserve, receptacle for maintaining, to be drawn upon, a desired volume of the liquid.

My invention is particularly applicable to internal combustion engines for supplying thereto, as for example to the carburetor thereof, liquid fuel, as for example gasoline, located in a tank below the carburetor, by the suction action of the engine; and my primary objects are to provide for the quick supplying of the liquid fuel to the carburetor in the case of starting the engine when the fuel-supplying system is dry regardless of the angle at which the car equipped with the vacuum feed apparatus, extends; to reduce the amount of liquid fuel which may leak from the system through leaks in the carburetor when the engine is not running; to provide for the rapid charging of the reserve receptacle, from the suction receptacle; to provide a novel, simple and inexpensive arrangement of tanks; to provide for a novel construction of discharge valve for the suction-receptacle; to provide for the ready assembling and disassembling of the parts of the apparatus; and other objects as will be manifest from the following description.

Referring to the accompanying drawing: Figure 1 is a vertical central section through my improved vacuum feed apparatus; and Figure 2, a section taken at the line 2 on Fig. 1 and viewed in the direction of the arrow.

The structure shown involves a suction tank 1 located in a reserve, or storage, tank 2 both shown as of cylindrical form and arranged concentrically. The cylindrical side wall 3 of the suction tank 1, which is shown as extending short of the bottom of the tank 2, extends upwardly through an opening 4 in the top 5 of the tank 2, its upper edge being provided with an annular outwardly-turned flange 6 overlapping the top 5 of the tank 2. The top 7 of the tank 1 is formed as a separate disk-like member which sets down into the side-wall portion 3 of the tank 1, and overlaps at an annular flange 8 thereon, the flange 6 of said side-wall portion, a gasket 9 of angular shape in cross section being interposed between said flanges. The top 7 is shown as secured to the members 3 by screws 10 passing through the flange 8, the gasket 9 and screwing into the flange 6. The bottom wall 11 of the tank 1 and formed of a disk is shown as apertured at 12 with which registers the open end of a tube 13, the lower end of which bears against the bottom wall of the tank 2 which is apertured at 14. Extending at its lower reduced and threaded end 15 through the aperture 12 and screwed into the threaded upper end of the tube 13, is a plug 16 forming a valve-housing and between the annular shouldered portion 17 of which and the upper end of the tube 13, the disk 11 is tightly clamped. The plug 16 contains a downwardly-opening threaded socket 18 into which is screwed the upper threaded end of a tube 19 located in the tube 13 and arranged concentrically therewith, the tube 19 extending at its lower threaded end through the aperture 14 in the bottom of the tank 2, a nut 20 screwing upon this end of the tube 19 and against the under side of the bottom of the tank 2. The interior of the tube 13 at its lower portion is in communication with the tank 2 as through the openings 21 and the interior of the tube 19 is in communication adjacent its upper end with the interior of the tube 13 as through the openings 22. The plug 16 at the portion thereof located within the tank 1 contains a recess 23 of circular shape in cross-section which opens into the tube 19 through passages 27 in the plug 16 which merge into a passage 27ª, the passages 27 opening into the recess 23 preferably at the opposite sides of the latter above the bottom wall of the recess, as shown. The recess is shown as extending in an inclined direction, the lower end of the recess having a reduced portion 24 opening into the interior of the tank 1 and affording an annular internal seat 25 for ball-valve 26 located within, and movable along, the larger portion of said recess, the ball 26 being shown as of less diameter than the cross-sectional dimension of the larger portion of the recess 23.

The tank 1 is provided with an inlet 28 in its top 7 for connection, by suitable piping, with the tank (not shown) of liquid fuel to be controlled, the tank last referred to being located below the inlet 28. The inlet 28 is preferably constructed as a conduit, or connection, of elbow-shape to afford the intercommunicating portions 28ª and 28ᵇ at angles to each other, a screen 28ᶜ being located, and secured, in the portion 28ª. The side-wall of the conduit 28 contains, at its angle portion, an opening 28ᵈ through which the screen may be inserted to, or withdrawn from, position in said conduit. The piping referred to for connecting the inlet 28 with the supply tank of liquid, referred to, being connected with the other end of the conduit 28 in any desirable manner. The opening 28ᵈ would be closed in any desirable manner as by means of a plug 28ᵉ screwed into the opening 28ᵈ. The tank 1 is also provided with an opening 29 in its top 7 forming a suction port which, in practice, would be connected with the source of suction to be utilized, as for example, and in accordance with common practice, with the internal combustion engine to be supplied with fuel by the apparatus, it being preferred that the port 29 be in communication with the intake of the engine between the carburetor and the inlet valves of the engine, the top 7 being also provided with an air port 30 shown as equipped with gravity valve 31 which latter in its lowered position closes the port and when lifted, as hereinafter described, opens the port to cause the interior of the tank 1 to be in communication with the atmosphere.

The tank 1 also contains mechanism for effecting the alternate filling of this tank, under the suction action created therein at the opening 29, with the liquid fuel through the inlet 28, and the discharging therefrom of the liquid from the tank 1, this mechanism in the particular construction shown, and which is preferably employed, forming the subject of a separate application filed by me for United States Letters Patent and upon which U. S. Patent No. 1,397,190 was granted November 15, 1921, and involving, generally stated, a float 32 located within the tank 1, a rod 33 extending upwardly and loosely through the float 32 and provided at its lower end with a collar 34 and at its upper end with two disks 35 and 36 of magnetic material arranged in vertically-spaced relation and cooperating with a permanent magnet 37 located within the tank 1 and secured to the under side of the cover 7 thereof, as by a screw 38. The rod 33 extends between the opposing poles 39 of the magnet, one only of these poles being shown, the latter extending into the space between the disks 35 and 36, the magnet 37 being provided with an upwardly projecting pin 40 of non-magnetic material. The upper end of the rod 33 is in the form of a valve 42 adapted when the rod 33 is raised to seat against the lower edge of the wall of the opening 29 and close the suction inlet, the disk 36 in rising to a position for closing the inlet 29 as stated, lifting the valve 31 to a position in which the interior of the tank 1 is caused to be in communication with the atmosphere. For the purpose of guiding the rod 33 in its lengthwise movements, its opposite ends extend into the restricted portion of the suction inlet 29 and into a socket 43 in the plug 16.

The tank 2 contains a vent 44 opening the interior of this tank to the atmosphere and is shown as provided with a drain-cock 45, for the usual purpose.

A description of the operation of the apparatus is as follows: Assuming that the inlet 28 is in communication with a supply of liquid fuel to be acted on by the apparatus, the lower end of the pipe 19 to be in communication with the float chamber of the carburetor of an internal combustion engine, the inlet 29 to be connected with the engine as hereinbefore stated, for producing suction therein in the operation of the engine, and the engine to be operating and the parts of the apparatus to be in the position represented in the drawing wherein, by reason of the open condition of the valve 42 suction is being exerted in the tank 1 with the result of drawing liquid therein through the inlet 28, the valve 31 being closed by gravity; as the liquid rises in the tank 1 it raises the float 32, the float in rising and engaging the disk 35 thereby forcing the rod 33 upwardly to a position in which the valve 42 closes the suction opening 29 and opens the valve 31, whereupon the suction in the tank 1 ceases and the latter is caused to be opened to the atmosphere. The buoying action of the liquid in the tank 1, on the float 32 operates to cause the attraction between the disk 36 and the magnet 37 to be overcome, and as soon as the rod 33 has risen to a position in which the attraction between the magnet and the disk 35 is greater than the attraction between the magnet and the disk 36, the rod 33 will be forcibly drawn upwardly to a position in which the valve 42 closes the suction inlet 29, in which position the disk 35 is out of contact with the magnet 37. When the suction inlet 29 is closed by the valve 42 as stated and communication is established between the interior of the tank 1 and the atmosphere through the port 30, the ball 26 moves away from the seat 25 and the pressure of the liquid in the tank 1 against the ball valve operates to force it to the left in the drawing in the inclined recess 23, thereby permitting the liquid in the tank 1 to flow into the pipe 19. If the pipe 19 is empty or only part full, the liquid discharging from the tank 1 will first fill up the pipe 19, and then overflow therefrom through the openings 22 into the pipe 13 and thence through the openings 21 into the reserve tank 2. In the descent of the float 32, due to the running of the liquid out of the tank 1, the float bears downwardly against the collar 34 with the result of lowering the rod 33 thereby opening the suction inlet 29 and permitting the valve 31 to close the air inlet 30, the disk 36 in approaching the magnet 37 operating to accelerate the downward movement of the rod 33 to its lowermost position represented in the drawing. The establishment of suction action in the tank 1, by reason of the operation of the parts as stated, causes the valve 26 to engage the seat 25 for closing the tank 1 to the tube 19, the liquid being drawn into the tank 1 through the inlet 28, by the suction action exerted through the inlet 29 as hereinbefore stated, until the liquid reaches a level in the tank 1 in which the float operates to close the inlet 29 as hereinbefore described, whereupon the charge of liquid drawn into the tank 1, is allowed to flow therefrom into the pipe 19 to run into the reserve tank 2, these alternate operations of filling the tank 1 with the liquid, by the suction action as stated, and the discharging of the liquid therefrom, being repeated, until the reserve tank 2 becomes charged with the liquid up to such a level that the float 22 may not lower sufficiently to open the valve 42 following the closing of the latter in the previous rising movement of the float 32.

It will be noted that the upper end of the tube 19 and the lower end of the tube 13, with the intercommunication therebetween at the upper ends of these tubes at the ports 22, constitute a siphon, it being necessary that the liquid in the tank 2, in its discharge from the apparatus, flow upwardly through the tube 13 to the ports 22. Assuming that the engine is operating, the liquid is supplied to the carburetor float chamber, directly from the tank 1 in the discharging of the latter, through the pipe 19, the overflow from this pipe flowing into the reserve tank 2, during such operation, unless during the discharging of the tank 1, the pipe 19 is filled up to the ports 22 in which case all of the liquid discharged from the tank 1 passes into the reserve tank 2.

During the filling of the tank 1 by the suction action the liquid is supplied to the carburetor assuming that the carburetor during the filling of the tank 1 draws upon the vacuum apparatus for liquid, from the reserve tank 2, the liquid, where the level thereof in the reserve tank 2 is above the ports 22, running out into the pipe 19 by gravity, but where the level in the reserve tank 2 is below the ports 22, siphoning out of this tank into the tube 19, by reason of the flowing of the liquid downwardly through the tube 19, the parts of the apparatus being so constructed and arranged as shown, that the suction action in the tank 1 serves to hold the valve 26 against the seat 25, during the filling of the tank 1, in opposition to the tendency of the valve 26 to drop away from its seat 25 and the tendency of the suction produced in the recess 25, by the siphoning action referred to, to draw the valve 26 away from its seat 25.

It will be noted from the foregoing that one of the advantages afforded by my improved vacuum apparatus is that, when the apparatus is dry, and when suction action is exerted in the tank 1 sufficient to draw liquid into it through the inlet 28 a quick discharge of the liquid in the tank 1 to the carburetor is effected inasmuch as the flow from the tank 1 is direct to the carburetor, as distinguished from discharge from the suction tank into a reserve tank and thence to the carburetor.

The apparatus also presents advantages in the matter of preventing waste of gasoline in case of leaks occurring at the carburetor or between the latter and the apparatus shown in the drawing, while the engine is not operating. As structures have hitherto been provided, in so far as I am aware, a leak in the float chamber and the vacuum apparatus, results in the draining of the tanks of the apparatus referred to. In an apparatus constructed in accordance with my invention, however, this cannot result, because the suction action produced by the siphoning action will be automatically relieved by the air in the tank 1 owing to the unseating of the valve 26 by reason of the absence of suction in the tank 1. In this connection it may be stated that the valve 26, while preferably of considerably less diameter than the cross-sectional diameter of the recess 23 in which it is located, may be provided, if desired, of such a size that it will snugly fit the recess but without preventing it from rolling along the latter, in which latter case the breaking of the suction in the siphon, when the engine is not operating and the liquid continues to flow downwardly through the pipe 19 as in the case of a leak, would be effected by the suction action produced by the siphoning, causing the valve 26 to move upwardly in the recess to a position in which the port 27 is uncovered.

Another advantage of constructing my apparatus in accordance with my invention is that the various parts thereof may be readily and quickly assembled and disassembled, at will.

The form of valve shown for controlling the discharge of the liquid from the suction tank 1 is of advantage as capillary action therein by the liquid is reduced to the minimum, and the provision of the relatively small area of surface at the seat 25 renders more positive the seating of the valve under suction.

The provision of the inlet as explained is of advantage as thereby the screen is rendered accessible for cleaning, removal and replacement, without disturbing the connections between the tank 1 and the piping connected therewith.

While I have illustrated and described a particular construction embodying my invention, I do not wish to be understood as intending to limit it thereto as the same may be variously modified and altered without departing from the spirit of the invention.

What I claim as new, and desire to secure by Letters Patent, is:

1. In vacuum apparatus, the combination of means operating to raise liquid to a point above the supply thereof and involving a receptacle into which the liquid is raised, a storage tank, a pipe through which the liquid discharges, and means for causing the liquid discharging from said receptacle to first charge said pipe and then direct the remainder of the liquid discharged from said receptacle into the storage tank, for discharge through said pipe.

2. The combination with an internal combustion engine having a carburetor, of vacuum apparatus comprising means operating to raise the liquid fuel for the engine from a point above the supply thereof and involving a receptacle into which the liquid is raised, a storage tank, a pipe through which the liquid is supplied to the carburetor, and means for causing the liquid discharging from said receptacle to first charge said pipe and then direct the remainder of the liquid discharging from said receptacle, into the storage tank, for discharge to the carburetor.

3. In vacuum apparatus, the combination of means operating to raise liquid to a point above the supply thereof and involving a receptacle into which the liquid is raised, a storage tank charged from said receptacle, a pipe leading from the discharge of said receptacle and through which the liquid flows and siphoning means connecting said tank with said pipe for effecting discharge of liquid from said storage tank.

4. In a vacuum apparatus, the combination of means operating to raise liquid to a point above the supply thereof and involving a receptacle into which the liquid is raised, a storage tank, a pipe in communication with the discharge end of said receptacle, and a conduit communicating with said tank and, at a higher elevation, communicating with said pipe and forming a siphon.

5. In vacuum apparatus, the combination of means operating to raise liquid to a point above the supply thereof and involving a receptacle into which the liquid is raised, a storage tank, a pipe in communication with the discharge end of said receptacle, a conduit communicating with said tank and at a higher elevation with said pipe and forming a siphon, and valve-means controlling the siphoning of the liquid from said tank to said pipe.

6. In vacuum apparatus, the combination of means operating to raise liquid to a point above the supply thereof and involving a receptacle into which the liquid is raised, a storage tank, a pipe in communication with the discharge end of said receptacle, a conduit communicating with said tank and, at a higher elevation, communicating with said pipe and forming a siphon, and valve-means controlling the siphoning of the liquid from said tank to said pipe and operating to shut off communication between said receptacle and siphon during suction action in said receptacle.

7. In vacuum apparatus, the combination of a suction-receptacle containing an inlet for liquid from a supply thereof to be operated on located at a lower level and an outlet for the liquid, means for exerting suction in said receptacle to charge the latter with liquid from said supply, means for interrupting suction action in said receptacle and admitting air thereto to permit of the flowing of the liquid from said receptacle, a storage tank, a pipe leading from the outlet of said receptacle and through which the liquid flows and siphoning means connecting said tank with said pipe for effecting discharge of liquid from said tank.

8. In vacuum apparatus, the combination of a suction-receptacle containing an inlet for liquid from a supply thereof to be operated on located at a lower level and an outlet for the liquid, means for exerting suction in said receptacle to charge the latter with liquid from said supply, means for interrupting suction action in said receptacle and admitting air thereto to permit of the flowing of the liquid from said receptacle, a storage tank, a pipe in communication with the outlet of said receptacle, and a conduit communicating with said tank and at a higher elevation with said pipe and forming a siphon.

9. In vacuum apparatus, the combination of a suction-receptacle containing an inlet for liquid from a supply thereof to be operated on located at a lower level and an outlet for the liquid, means for exerting suction in said receptacle to charge the latter with liquid from said supply, means for interrupting suction action in said receptacle and admitting air thereto to permit of the flowing of the liquid from said receptacle, a storage tank, a pipe in communication with the outlet of said receptacle, a conduit communicating with said tank and at a higher elevation with said pipe and forming a siphon, and valve-means controlling the siphoning of the liquid from said tank to said pipe.

10. In vacuum apparatus, the combination of a suction-receptacle containing an inlet for liquid from a supply thereof to be operated on located at a lower level and an outlet for the liquid, means for exerting suction in said receptacle to charge the latter with liquid from said supply, means for interrupting suction action in said receptacle and admitting air thereto to permit of the flowing of the liquid from said receptacle, a storage tank, a pipe in communication with the outlet of said receptacle, a conduit communicating with said tank and at a higher elevation with said pipe and forming a siphon, and valve-means controlling the siphoning of the liquid from said tank to said pipe and operating to shut off communication between said receptacle and siphon during suction action in said receptacle.

11. In combination with an internal combustion engine, a suction-receptacle containing an inlet for liquid-fuel to be supplied to the engine from a supply thereof located at a level below said receptacle, an outlet for the liquid, an opening for relieving vacuum in said receptacle, and a suction inlet connected with the engine and through which suction produced by the engine is exerted in said receptacle, valves controlling said opening, suction-inlet and outlet, means operating when the liquid drawn into said receptacle reaches a predetermined height to close the valve controlling said suction-inlet and upon discharge of liquid from said receptacle open the valve containing said suction inlet, said valve controlling said opening operating responsive to the establishing and discontinuing of suction in said receptacle to become closed and opened, respectively, a pipe leading from said outlet to the engine for discharge therethrough of the liquid raised into said receptacle, and a conduit communicating with said tank and at a higher elevation with said pipe, and forming with the latter a siphon, said valve at said outlet being constructed and arranged to open to permit of the discharge of the liquid from said receptacle, to close, and remain closed, upon the creation of suction in said receptacle in opposition to the tendency to open during the siphoning of liquid from said tank, and to move to a position in which the siphoning action is caused to cease when suction action in said receptacle ceases, and said pipe and conduit being so arranged that the said pipe first becomes charged with liquid from said receptacle and the surplus of liquid from the latter flows through said conduit into said tank.

12. In vacuum apparatus, the combination of a suction tank having a liquid-outlet, and valve means for controlling the flow of liquid through said outlet comprising a passage having a restricted portion at which it communicates with said outlet and affording a seat, and a ball valve located, and movable, in said passage and cooperating with said seat, said ball valve being of such diameter as to provide a clearance between the latter and the wall of said passage when said valve is out of engagement with said seat, said valve means being movable to closed position by the exertion of suction in said tank and adapted to move, by gravity, to open position when suction is discontinued.

13. In vacuum apparatus, the combination of a suction tank having a liquid-outlet, and valve means for controlling the flow of liquid through said outlet comprising a passage having a restricted portion at which it communicates with said outlet and affording a seat, said passage inclining upwardly away from said seat, and a ball valve located, and movable, in said passage and cooperating with said seat, said valve means being movable to closed position by the exertion of suction in said tank and adapted to move, by gravity, to open position when suction is discontinued.

14. In vacuum apparatus, the combination of a suction-receptacle containing an inlet for liquid from a supply thereof to be operated on located at a lower level and an outlet for the liquid, means for exerting suction in said receptacle to charge the latter with liquid from said supply, means for interrupting suction action in said receptacle and admitting air thereto to permit of the flowing of the liquid from said receptacle, a storage tank, a pipe in communication with the outlet of said receptacle, a conduit communicating with said tank and at a higher elevation with said pipe and forming a siphon, and valve-means controlling the siphoning of the liquid from said tank to said pipe and operating to shut off communication between said receptacle and siphon during suction action in said receptacle, and open communication between said receptacle and siphon when suction is not being exerted in said receptacle and no liquid exists therein.

15. In vacuum apparatus, the combination of a suction tank having a liquid outlet, a passage communicating with said outlet and inclining upwardly away from said outlet, and a ball valve located, and movable, in said passage and controlling said outlet, said passage containing an outlet located to one side of said tank outlet, said ball moving beyond the outlet in said passage in the discharge of liquid from said tank.

16. In vacuum apparatus, the combination of a suction tank having a liquid-outlet, a passage communicating with said outlet, and a ball valve located, and movable, in said passage and controlling said outlet and movable automatically to a position in which said passage is open to said tank outlet when no suction exists in said tank, said passage containing an outlet in its side wall located beyond said tank outlet and beyond which said valve is movable.

17. In vacuum apparatus, the combination of a suction tank having a liquid-outlet, a passage communicating with said outlet, and a ball valve located, and movable, in said passage and controlling said outlet and movable automatically to a position in which said passage is open to said tank outlet when no suction exists in said tank, said passage containing an outlet in its side wall located beyond said tank outlet, said ball in automatically moving to open position as stated becoming positioned between said outlets and movable beyond the outlet in said passage by the discharge of liquid from said tank.

18. In vacuum apparatus, the combination of a suction tank having a liquid outlet, a passage communicating with said outlet and inclining upwardly away from said outlet, and a ball valve located, and movable, in said passage and controlling said outlet and movable automatically to a position in which said passage is open to said tank outlet when no suction exists in said tank, said passage containing an outlet in its side wall located beyond said tank outlet and said ball valve being movable, by the discharge of liquid from said tank, to a position beyond said last-named outlet.

19. In vacuum apparatus, the combination of a suction tank having a liquid-outlet, a passage communicating with said outlet and having a seat and an outlet, and a ball valve located, and movable in said passage and controlling the outlet of said tank, said valve being movable automatically by gravity away from said seat to a position in which said passage is open to said tank outlet when no suction exists in said tank, said valve being movable, by the action of liquid discharging from said tank, out of the position to which it automatically moves by gravity as stated, the parts being so constructed and arranged that a greater cross-sectional area of passage-way is provided between said outlets when said valve is moved by said liquid to the position stated, than when said valve is in the position to which it moves by gravity.

20. In vacuum apparatus, the combination of a suction tank having a liquid-outlet, a passage communicating with said outlet and having a seat and an outlet, and a ball valve located, and movable, in said passage and controlling the outlet of said tank, said valve being movable automatically by gravity away from said seat to a position closely adjacent thereto when no suction exists in said tank and in which position said passage is open to said tank outlet, said valve being movable, by the action of liquid discharging from said tank, out of its said position adjacent said seat, the parts being so constructed and arranged that a greater cross-sectional area of passage-way is provided between said outlets when said valve is moved to the position last stated than when said valve is in the position to which it moves by gravity.

EDWARD J. WIGGINS.